United States Patent
Kinoshita et al.

(10) Patent No.: US 8,850,927 B2
(45) Date of Patent: Oct. 7, 2014

(54) DYNAMIC VIBRATION ABSORBER

(75) Inventors: Tomonori Kinoshita, Echizen (JP); Katsunori Tanaka, Echizen (JP); Aki Ogawa, Echizen (JP); Naohisa Yamashita, Echizen (JP); Makoto Yamaguchi, Echizen (JP)

(73) Assignee: Aisin AW Industries Co., Ltd., Fukui (JP)

( * ) Notice: Subject to any disclaimer, the term of this patent is extended or adjusted under 35 U.S.C. 154(b) by 536 days.

(21) Appl. No.: 13/221,277

(22) Filed: Aug. 30, 2011

(65) Prior Publication Data

US 2012/0222515 A1    Sep. 6, 2012

(30) Foreign Application Priority Data

Sep. 8, 2010  (JP) ................... 2010-200640

(51) Int. Cl.
*F16F 15/31* (2006.01)
*F16F 15/10* (2006.01)

(52) U.S. Cl.
CPC .................................. *F16H 15/145* (2013.01)
USPC ........................................ 74/574.4; 74/572.2

(58) Field of Classification Search
USPC ............. 74/572.2, 572.21, 574.2–574.4, 603, 74/604; 464/180
See application file for complete search history.

(56) References Cited

U.S. PATENT DOCUMENTS

| | | | |
|---|---|---|---|
| 2,346,972 A * | 4/1944 | Kishline | ...................... 74/574.2 |
| 3,296,887 A | 1/1967 | Larsen | |
| 5,295,411 A * | 3/1994 | Speckhart | .................... 74/574.3 |
| 5,520,271 A | 5/1996 | Kohno et al. | |
| 6,374,698 B1 | 4/2002 | Carlson et al. | |
| 6,382,050 B1 * | 5/2002 | Carlson et al. | ............... 74/570.2 |

FOREIGN PATENT DOCUMENTS

| | | | | |
|---|---|---|---|---|
| CN | 1896560 A | | 1/2007 | |
| EP | 1780434 A2 | | 5/2007 | |
| JP | 06-307499 A | | 1/1994 | |
| JP | 08-121187 A | | 5/1995 | |
| JP | 07-280037 A | | 10/1995 | |
| JP | 08093855 A | * | 4/1996 | ............. F16F 15/14 |
| JP | 09-236155 A | | 9/1997 | |
| JP | 2000-283242 A | | 10/2000 | |
| JP | 2003-049903 A | | 2/2003 | |

OTHER PUBLICATIONS

International Preliminary Report on Patentability (PCT/IB/373) pertaining to corresponding International Application No. PCT/JP2011/069536.

(Continued)

*Primary Examiner* — Thomas Diaz
(74) *Attorney, Agent, or Firm* — Marsh Fischmann & Breyfogle LLP

(57) ABSTRACT

Rolling element bores are provided in the outer circumferential portion of a disk-like main body. Each rolling element bore has an arcuate outer rim. Rollers each have a groove formed on the peripheral edge and extending along the entire circumference of the roller. The outer rim of each rolling element bore engages with the groove of the associated roller so that the roller is loosely fitted in the rolling element bore. Shafts are respectively formed on both sides of each roller. The shafts project from the center of the roller. An elastic ring is mounted on each shaft. Annular guide plates are respectively mounted on both sides of the disk-like main body so that the shafts of the rollers are supported by the guide plates.

6 Claims, 5 Drawing Sheets

(56) References Cited

OTHER PUBLICATIONS

International Search Report (PCT/ISA/220), PCT Application No. PCT/JP2011/069536, 10 Pages.

Chinese Office Action dated May 5, 2014, Chinese Patent Application No. 201180043776.6, 5 pages.

* cited by examiner

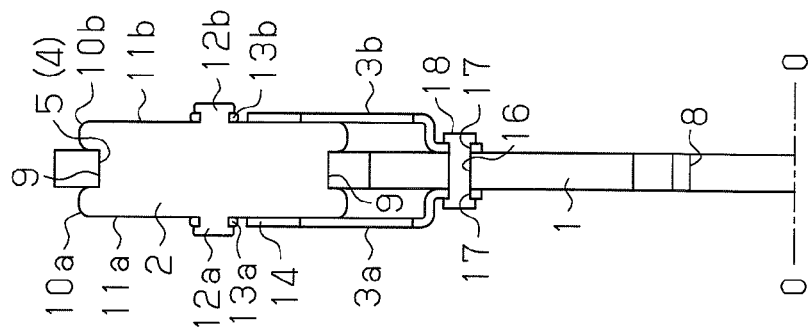
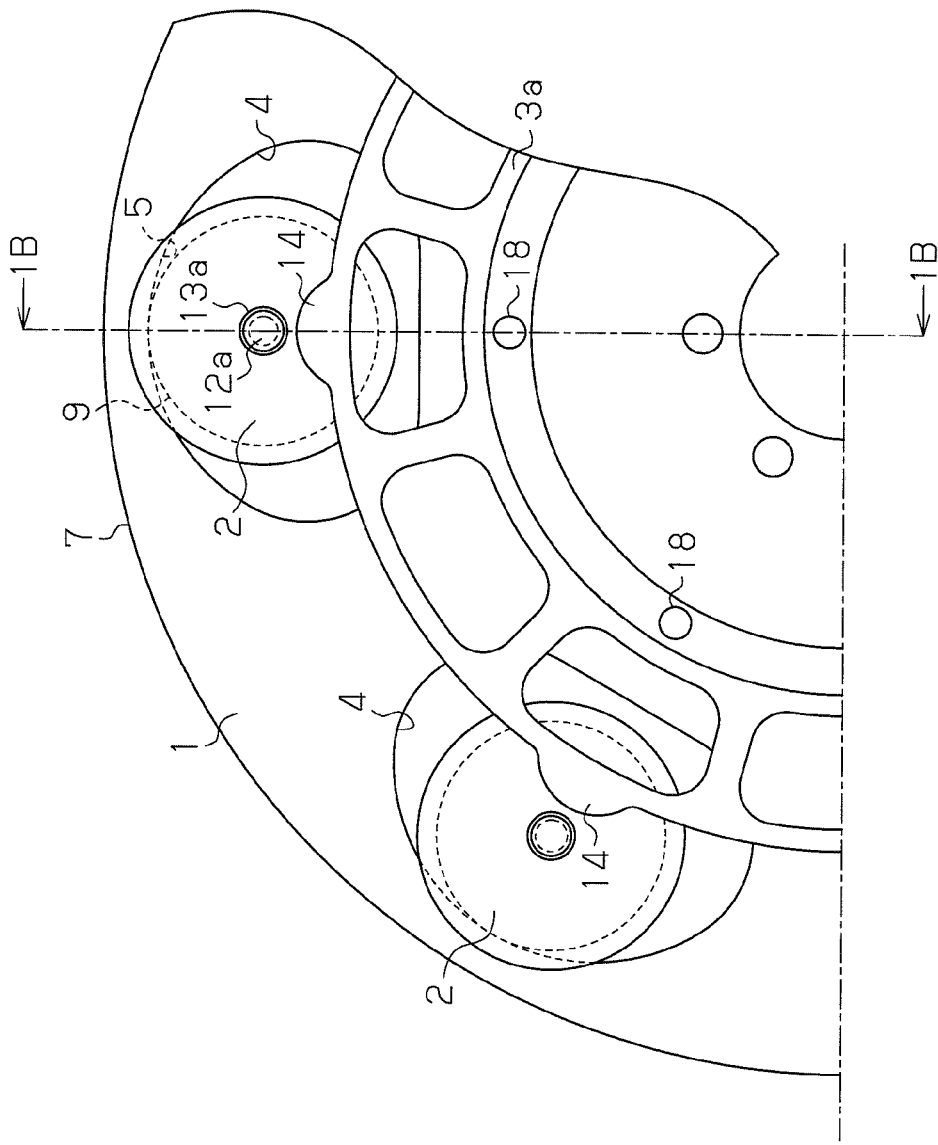

DYNAMIC VIBRATION ABSORBER

BACKGROUND OF THE INVENTION

The present invention relates to a dynamic vibration absorber that reduces torsional vibration of a power transmission system caused in accordance with torque fluctuation of an automobile engine.

Conventionally, in fields such as automobiles, dynamic vibration absorbers have been proposed for reducing torsional vibration that occurs in power transmission systems. The dynamic vibration absorbers are typically mounted on a flywheel portion coupled to the crankshaft of the engine. Circular rolling element chambers are formed in the flywheel main body on which the dynamic vibration absorber is mounted. A spherical or roller type rolling element is accommodated in each of the rolling element chambers. In the dynamic vibration absorber, when the flywheel main body is rotated, the rolling elements that resonate with a predetermined order of the torsional vibration of the power transmission system roll in the rolling element chambers. Accordingly, a dynamic vibration absorbing operation is performed, and torsional vibration is absorbed.

In such a centrifugal pendulum dynamic vibration absorber, since each rolling element smoothly rolls along the rolling surface of the associated rolling element chamber when the rotational speed of the power transmission system is fast, the torsional vibration is absorbed. However, when the rotational speed of the power transmission system is slow such as when starting the engine or when the engine is stopped, the centrifugal force acting on the rolling elements is reduced, causing each rolling element to irregularly move in the associated rolling element chamber. Thus, the rolling elements collide against the inner wall of the rolling element chambers, which might generate noise and small vibration.

Japanese Laid-Open Patent Publication No. 7-280037 discloses a centrifugal pendulum vibration absorber that inhibits irregular movement of pendulums when the rotational speed of the power transmission system is reduced to prevent generation of noise and small vibration. The centrifugal pendulum vibration absorber disclosed in this document absorbs torsional vibration by resonance of the pendulums accommodated in the rolling element chambers. A stopper protrusion is formed at the center of the side surface of the rolling element, which is the centrifugal pendulum. A guide groove is formed in the side wall of each rolling element chamber.

The guide groove extends along an arc that is coaxial with the rolling surface of the rolling element chamber along which the rolling element rolls. With this structure, the stopper protrusion is loosely fitted in the guide groove, and the stopper protrusion abuts against the wall of the guide groove. Accordingly, the path of each rolling element is restricted to the arc extending along the rolling surface. The width and the length of the guide groove is set such that the stopper protrusion does not contact the wall of the guide groove during normal rolling of the rolling element, and the stopper protrusion abuts against the wall of the end portion of the guide groove only when the rolling element separates from the rolling surface or when the rolling element is rotated by a predetermined angle θ or more.

Also, an annular protrusion is formed at the peripheral edge of each rolling element. An annular groove is formed in the inner circumferential surface of each rolling element chamber. The annular protrusion of each rolling element is fitted in the annular groove of the associated rolling element chamber with a predetermined gap. The axial movement of each rolling element is restricted by fitting the annular protrusion in the annular groove. Each rolling element rolls along general part of the rolling surface except the annular groove.

A pair of the rolling element chambers provided with the guide grooves needs to be formed per each of the rolling elements. Also, highly accurate cutting is required for machining the guide grooves such that the rolling elements smoothly roll. This significantly increases the manufacturing costs. As described above, the structure of the centrifugal pendulum vibration absorber is very complicated. Furthermore, machining for manufacturing the centrifugal pendulum vibration absorber requires high dimension accuracy.

Moreover, although the stopper protrusion of each rolling element abuts against the wall of the associated guide groove to restrict the path of the rolling element as described above, collision noise occurs when the stopper protrusion abuts against the wall of the guide groove depending on the movement of the rolling element.

SUMMARY OF THE INVENTION

Accordingly, it is an objective of the present invention to provide a dynamic vibration absorber that has a simple structure, reduces manufacturing costs, and efficiently absorbs torsional vibration generated in a power transmission system.

To achieve the foregoing objective and in accordance with one aspect of the present invention, a dynamic vibration absorber is presented that is mounted on a power transmission system for absorbing torsional vibration associated with torque fluctuation of an engine. The dynamic vibration absorber includes a disk-like main body, a plurality of rollers, and a pair of annular guide plates. The disk-like main body includes a plurality of rolling element bores arranged on an outer circumferential portion of the disk-like main body. The rollers are loosely fitted in the rolling element bores of the disk-like main body. The pair of annular guide plates are respectively mounted on both sides of the disk-like main body. Each rolling element bore includes an outer rim extending along an arc. Each roller includes a groove formed on an outer circumferential surface of the roller. The groove extends along the entire circumference of the roller. The outer rim of each rolling element bore is engaged with the groove of the associated roller. Each roller includes shafts respectively provided on both sides of the roller. The shafts project from the center of the roller. The shafts of each roller are supported by the pair of guide plates.

BRIEF DESCRIPTION OF THE DRAWINGS

FIG. 1A is a partial side view illustrating a dynamic vibration absorber according to one embodiment of the present invention;

FIG. 1B is a partial cross-sectional view taken along line 1B-1B of FIG. 1A;

DESCRIPTION OF THE PREFERRED EMBODIMENTS

A dynamic vibration absorber according to one embodiment of the present invention will now be described with reference to FIGS. 1A to 4.

Figure 2:
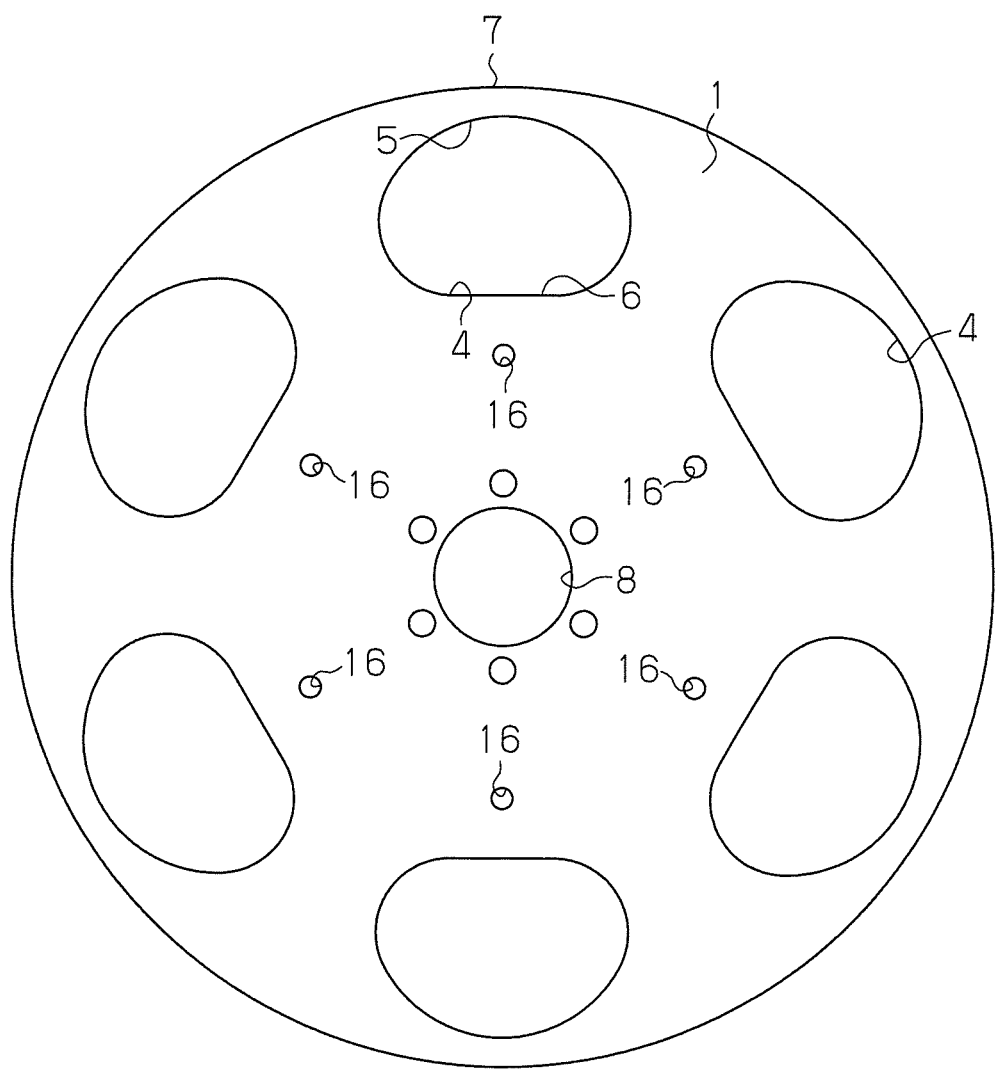
FIG. 2 is a side view illustrating the entire disk-like main body forming the dynamic vibration absorber.

As shown in FIGS. 1A and 2, the dynamic vibration absorber includes a disk-like main body 1, rollers 2, and a pair of guide plates 3a, 3b. Six rolling element bores 4 are formed in the outer circumferential portion of the disk-like main body 1. The rolling element bores 4 are arranged at equal angular intervals around the center of the disk-like main body 1. The rolling element bores 4 have a generally elliptical shape.

Each rolling element bore 4 has an outer rim 5 and an inner rim 6 having different shapes. The radius of curvature of the outer rim 5 is set smaller than the radius of curvature of the peripheral edge 7 of the disk-like main body 1. The outer rim 5 extends along an arc having a predetermined radius of curvature. The inner rim 6 extends along a curved line at both ends, and extends otherwise along a straight line.

A central bore 8 is formed at the center of the disk-like main body 1. The shaft extending from the power transmission system is inserted in the central bore 8. Six mounting holes 16 are also formed in the disk-like main body 1. The mounting holes 16 are arranged inward of the rolling element bores 4 to correspond to the rolling element bores 4. The disk-like main body 1 is formed by simultaneously stamping out the outer shape of the disk-like main body 1, the rolling element bores 4, the central bore 8, and the mounting holes 16 from a plate material having a certain thickness.

Figure 3A:
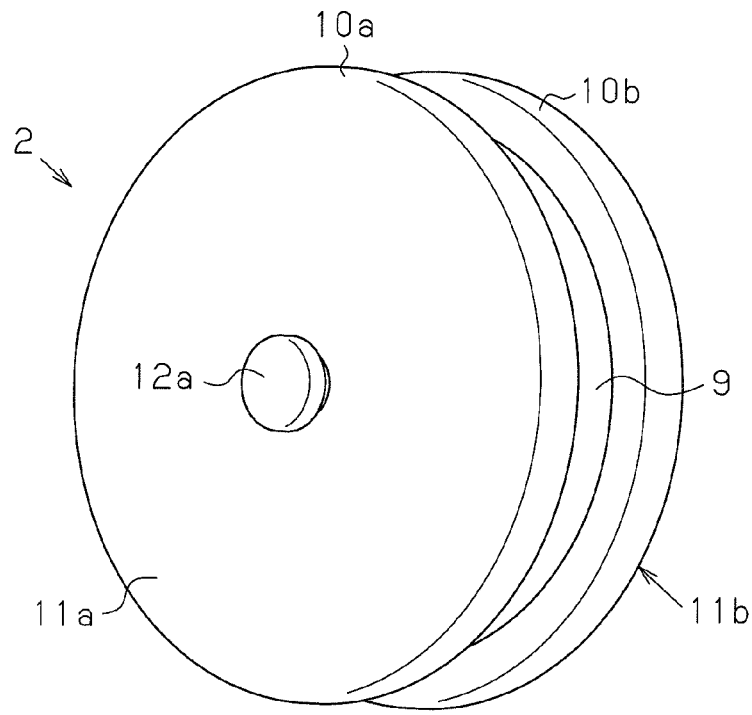
FIG. 3A is a perspective view illustrating a roller on which an elastic ring is not mounted.
Figure 3B:
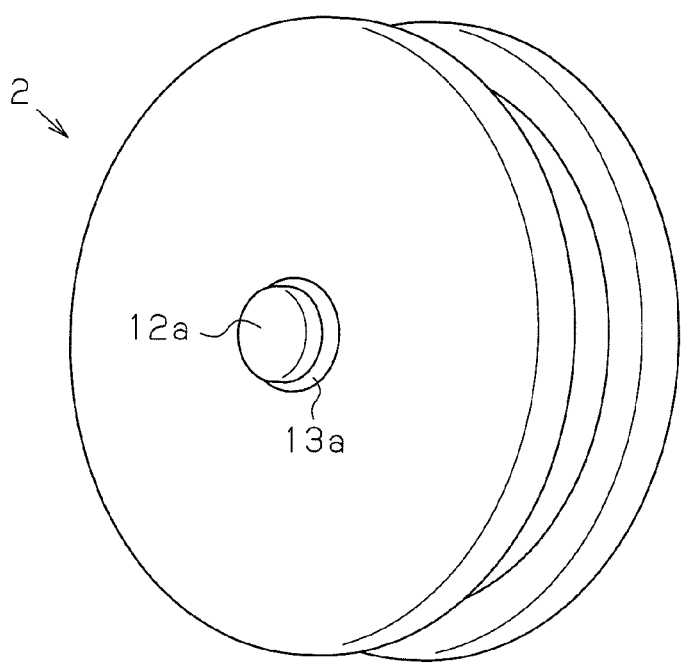
FIG. 3B is a perspective view illustrating the roller on which the elastic ring is mounted.

As shown in FIGS. 3A and 3B, each roller 2 is formed into a substantially disk-like shape as a whole. More specifically, the roller 2 includes a pair of first disks having a large outer diameter, and a second disk having a small outer diameter. The first disks sandwich the second disk from both sides. Thus formed roller 2 has on its peripheral edge a groove 9 extending along the entire circumference of the roller 2.

The groove 9 is located on the peripheral edge of the roller 2 at the center in the axial direction. The peripheral edges of both sides of the roller 2 are formed as ribs 10a, 10b. The groove 9 is located between the ribs 10a, 10b. That is, the peripheral edges of the first disks, which have a large diameter, are formed as the ribs 10a, 10b. Also, the space surrounded by the peripheral edge of the second disk, which has a small diameter, and the pair of first disks is formed as the groove 9.

Each roller 2 has a pair of side surfaces 11a, 11b. The side surfaces 11a, 11b respectively have shafts 12a, 12b, which project from the center of the roller 2. Elastic rings 13a, 13b are respectively mounted on the proximal ends of the shafts 12a, 12b.

As shown in FIGS. 1A, 1B, 3A, and 3B, each roller 2 is loosely fitted in one of the rolling element bores 4 of the disk-like main body 1. Thus, each roller 2 rolls along the outer rim 5 of the associated rolling element bore 4 formed in the disk-like main body 1. The guide plates 3a, 3b are respectively mounted on both sides of the disk-like main body 1. The guide plates 3a, 3b are both formed into a ring having the same shape and the same dimension. More specifically, the guide plates 3a, 3b are formed into the shape and the dimension that provides a gap between the shafts 12a, 12b of each roller 2 and an arcuate projection 14 when each roller 2 rolls along the outer rim 5 of the associated rolling element bore 4.

Six arcuate projections 14 are formed on the peripheral edge of each of the guide plates 3a, 3b. The arcuate projections 14 are arranged at equal angular intervals around the center of the guide plates 3a, 3b. Six mounting holes 17 are formed in each of the guide plates 3a, 3b. The mounting holes 17 are arranged inward of the arcuate projections 14 to correspond to the arcuate projections 14.

The guide plates 3a, 3b are arranged to sandwich the disk-like main body 1 from both sides and such that the mounting holes 17 of the guide plates 3a, 3b match with the mounting holes 16 of the disk-like main body 1. In this state, pins 18 are inserted in and fixed to the mounting holes 17 of the guide plates 3a, 3b and the mounting holes 16 of the disk-like main body 1. In this manner, the guide plates 3a, 3b are mounted on both sides of the disk-like main body 1.

Also, the rollers 2 loosely fitted in the rolling element bores 4 are sandwiched by the pair of guide plates 3a, 3b mounted on the disk-like main body 1. More specifically, the rollers 2 are sandwiched by the pair of guide plates 3a, 3b at the portion closer to the center of the disk-like main body 1 than the shafts 12a, 12b. Thus, the rollers 2 are held by the guide plates 3a, 3b and are prevented from falling out of the rolling element bores 4.

As described above, the rollers 2 are loosely fitted in the rolling element bores 4. In this state, the outer rim 5 of each rolling element bore 4 is engaged with the groove 9 of the associated roller 2. Thus, the outer rim 5 of each rolling element bore 4 is sandwiched by the pair of ribs 10a, 10b of the associated roller 2. That is, in a state where the outer rim 5 of each rolling element bore 4 is sandwiched by the pair of ribs 10a, 10b, the guide plates 3a, 3b are mounted on both sides of the disk-like main body 1 to sandwich the rollers 2.

In this manner, the rollers 2 are mounted on the disk-like main body 1 such that the outer circumferential surfaces of the guide plates 3a, 3b abut against the shafts 12a, 12b, and each outer rim 5 engages with the associated groove 9. Thus, the rollers 2 are mounted on the disk-like main body 1 while being loosely fitted in the rolling element bores 4 and prevented from falling out of the rolling element bores 4.

Figure 4:
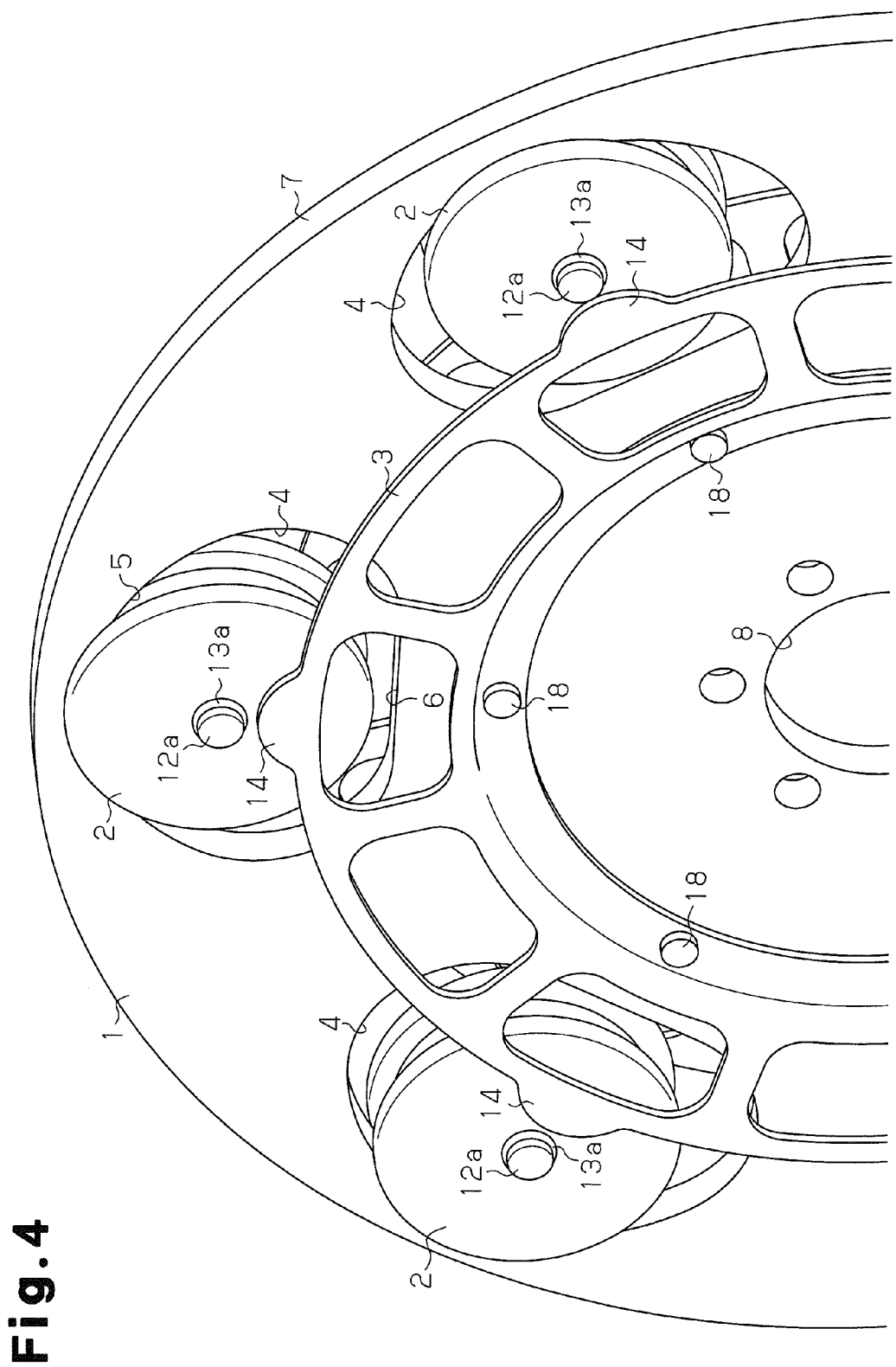
FIG. 4 is a partial perspective view illustrating a state where the dynamic vibration absorber is mounted on the shaft of the power transmission system and rotated.

As shown in FIG. 4, when the dynamic vibration absorber is rotated in accordance with the rotation of the shaft of the power transmission system, centrifugal force acts on the rollers 2. The outer rim 5 of each rolling element bore 4 extends along an arc to define a smoothly curved line. Thus, the distance between the outer rim 5 and the center of the rolling element bore 4 is not uniform, and is the maximum in the vicinity of the center of the rolling element bore 4. Therefore, when each roller 2 receives centrifugal force in the associated rolling element bore 4, each roller 2 moves to the center of the rolling element bore 4 and is steadily maintained at the central position.

As long as the dynamic vibration absorber continues to rotate at a constant speed, the position of each roller 2 does not change and does not move from the central position of the associated rolling element bore 4. However, when the rotational speed of the dynamic vibration absorber is increased due to torque fluctuation of the engine, that is, when the vehicle accelerates, the positions of the rollers 2 change toward the trailing end with respect to the rotation direction of the dynamic vibration absorber. When the rotational speed of the dynamic vibration absorber is reduced, that is, when the vehicle decelerates, the positions of the rollers 2 are changed toward the leading end with respect to the rotation direction of the dynamic vibration absorber.

Each roller 2 is supported by the arcuate projections 14 of the guide plates 3a, 3b via the shafts 12a, 12b. Each roller 2 selectively moves to the trailing end and the leading end along the outer rim 5 of the associated rolling element bore 4 in accordance with the variation of the rotational speed of the dynamic vibration absorber as described above. However, the rollers 2 are formed such that the shafts 12a, 12b and the arcuate projections 14 do not interfere when the rollers 2 roll. Also, when the dynamic vibration absorber is rotated, each roller 2 hardly rolls along the outer rim 5. Although torsional vibration generated in the power transmission system due to torque fluctuation of the engine is absorbed as the rollers 2 roll, the rolled distance of the rollers 2 is very small.

When the dynamic vibration absorber is rotated at a high speed, the rollers 2 loosely fitted in the rolling element bores 4 receive centrifugal force and are thus engaged with the outer rims 5 of the rolling element bores 4. In a case where the rotational speed of the dynamic vibration absorber is reduced, for example, when the engine is started or when the engine is stopped, centrifugal force applied to the rollers 2 is reduced. Thus, the rollers 2 separate from the outer rims 5, and the shafts 12a, 12b of the rollers 2 abut against the arcuate projections 14 of the guide plates 3a, 3b via the elastic rings 13a, 13b.

The present embodiment has the following advantages.

(1) The disk-like main body 1 is formed by simultaneously stamping out the outer shape of the disk-like main body 1 and the rolling element bores 4 from the plate material having a certain thickness. The guide plates 3a, 3b can also be formed by stamping out as in the case of the disk-like main body 1. Since cutting is not required when manufacturing the dynamic vibration absorber, the manufacturing costs of the dynamic vibration absorber is reduced. Also, the dynamic vibration absorber has a structure in which the rollers 2 are loosely fitted in the rolling element bores 4 of the disk-like main body 1, and the pair of guide plates 3a, 3b sandwich the rollers 2 so that the rollers 2 do not fall out of the rolling element bores 4. Also, the size of the pair of guide plates 3a, 3b is smaller than the dimension of a circle including the shafts 12a, 12b of the rollers 2 loosely fitted in the rolling element bores 4. With this structure, the mass of the rollers 2 can be relatively increased, thereby increasing the absorbing capacity of the torsional vibration. Also, according to the present embodiment, since the mass of the rollers 2 can be freely adjusted, for example, the mass of the rollers 2 can be reduced by forming an annular groove in the side surfaces 11a, 11b of the rollers 2. Conversely, the mass of the rollers 2 can be increased by changing the guide plates 3a, 3b to other guide plates and increasing the thickness of the rollers 2 within a mountable range. In this manner, the torsional vibration generated in the power transmission system is efficiently absorbed by changing the mass of the rollers 2 as needed.

(2) When the rotational speed of the dynamic vibration absorber is reduced, centrifugal force applied to the rollers 2 is reduced. Thus, the rollers 2 separate from the outer rims 5, and the shafts 12a, 12b of the rollers 2 abut against the arcuate projections 14 of the guide plates 3a, 3b. In this respect, according to the present invention, since the elastic rings 13a, 13b are mounted on the shafts 12a, 12b of each roller 2, the components forming the dynamic vibration absorber are prevented from generating noise by colliding with each other.

(3) Each roller 2 is formed by a pair of disks having a large diameter sandwiching a disk having a small diameter. With this structure, each roller 2 is formed by stacking the disks such that the pair of disks having a large diameter sandwich the disk having a small diameter, and pressing the shaft into the central bores of the disks. Since cutting is not required when manufacturing the rollers 2, the manufacturing costs of the dynamic vibration absorber is reduced.

The present embodiment may be modified as follows.

In the present embodiment, the inner rim 6 may be an arc having a predetermined radius of curvature like the outer rim 5.

In the present embodiment, the disk-like main body 1 may be manufactured by a process other than the typical stamping process such as fine blanking using hydrostatic pressure. According to the typical stamping process, a fracture zone is generated on the disk-like main body 1. However, according to the fine blanking process, the peripheral edge 7, the rolling element bores 4, and the central bore 8 of the disk-like main body 1 are sheared without generating a fracture zone on the disk-like main body 1. Thus, the disk-like main body 1 is manufactured with a high dimensional accuracy.

Figure 5:
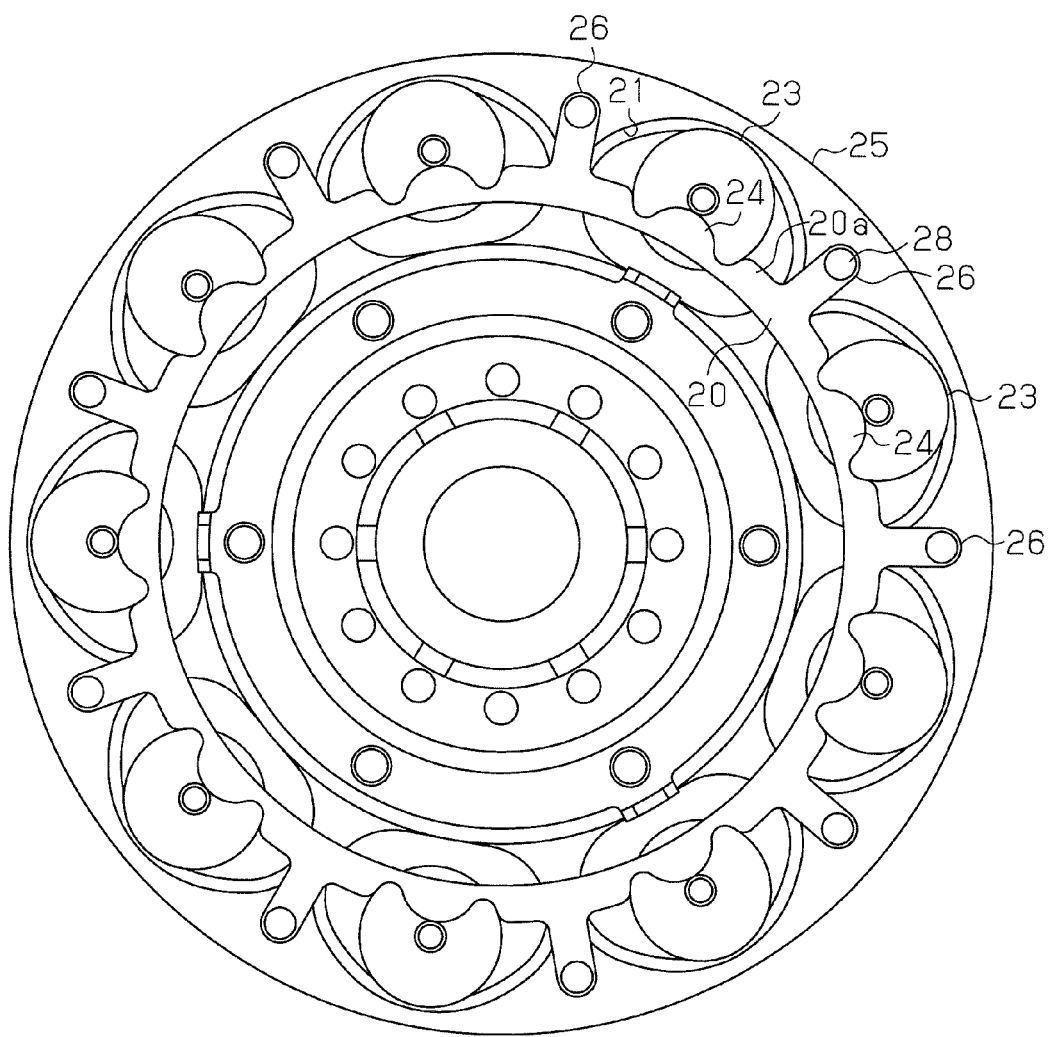
FIG. 5 is a side view illustrating a dynamic vibration absorber according to a modified embodiment of the present invention.

In the present embodiment, the pair of guide plates 3a, 3b are secured to both sides of the disk-like main body 1 on the inner side of the arcuate projections 14, but may be secured to both sides of the disk-like main body 1 on the outer side of the arcuate projections 14. For example, as shown in FIG. 5, mounting pieces 26 attached to a disk-like main body 25 may be formed on a peripheral edge 20a of a pair of annular guide plates 20 in addition to arcuate projections 24 that support rollers 23 in rolling element bores 21. The mounting pieces 26 extend radially from the center of each guide plate 20 and are arranged at equal angular intervals around the center of the guide plate 20. The mounting pieces 26 and the arcuate projections 24 are alternately arranged along the entire circumference of each guide plate 20 on the peripheral edge. 20a of the guide plate 20. The pair of guide plates 20 are mounted on both sides of the disk-like main body 25 by inserting and fixing pins 28 into the mounting pieces 26 and mounting holes in the disk-like main body 25.

In the present embodiment, the number of the rolling element bores 4 formed in the outer circumferential portion of the disk-like main body 1 and the number of the rollers 2 loosely fitted in the rolling element bores 4 may be changed as needed.

In the present embodiment, the positions of the mounting holes 16 do not need to correspond to the rolling element bores 4. Also, the positions of the mounting holes 17 do not need to correspond to the arcuate projections 14.

The invention claimed is:

1. A dynamic vibration absorber mounted on a power transmission system for absorbing torsional vibration associated with torque fluctuation of an engine, the dynamic vibration absorber comprising:
a disk-like main body including a plurality of rolling element bores arranged on an outer circumferential portion of the disk-like main body;
a plurality of rollers loosely fitted in the rolling element bores of the disk-like main body; and
a pair of annular guide plates respectively mounted on both sides of the disk-like main body, wherein
each rolling element bore includes an outer rim extending along an arc,
each roller includes a groove formed on an outer circumferential surface of the roller, the groove extending along the entire circumference of the roller,
the outer rim of each rolling element bore is engaged with the groove of the associated roller,
each roller includes shafts respectively provided on both sides of the roller, the shafts projecting from the center of the roller, and
the shafts of each roller are supported by the pair of guide plates,
wherein an elastic ring is mounted on the shafts of each roller.

2. The dynamic vibration absorber according to claim 1, wherein each roller is formed by a pair of disks having a large diameter sandwiching a disk having a small diameter.

3. The dynamic vibration absorber according to claim 1, wherein the disk-like main body is formed by simultaneously stamping out the outer shape of the disk-like main body and the rolling element bores from a plate material having a certain thickness.

4. The dynamic vibration absorber according to claim 3, wherein the disk-like main body is formed by fine blanking using hydrostatic pressure.

5. The dynamic vibration absorber according to claim 1, wherein projections for supporting the shafts of the rollers are formed on peripheral edges of the guide plates.

6. The dynamic vibration absorber according to claim 5, wherein the projections are formed into an arcuate shape.

* * * * *